United States Patent Office 2,959,468
Patented Nov. 8, 1960

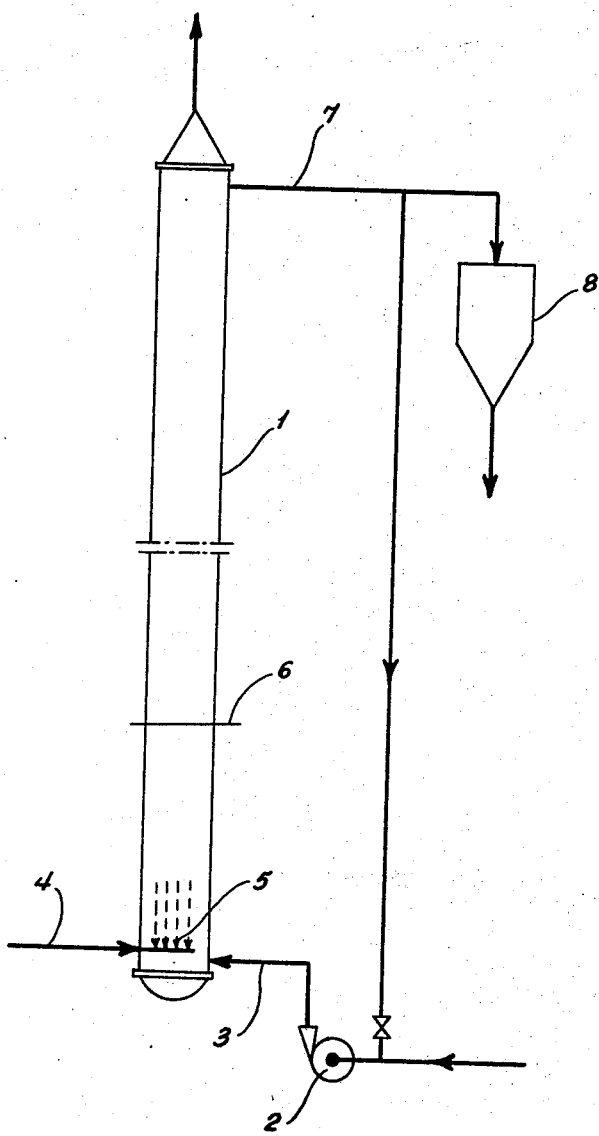

2,959,468
PROCESS FOR THE PRODUCTION OF ALKALI METAL PEROXIDE

Runar Mauritz Rafaelsson Ornhjelm, Kuusankoski, Finland, assignor to Kymin Osakeyhtio-Kymmene Aktiebolag, Kuusankoski, Finland, a company of Finland Filed July 29, 1957, Ser. No. 674,943

Claims priority, application Sweden July 30, 1956

4 Claims. (Cl. 23—184)

This invention relates to a process in the production of alkali peroxide by oxidation of autoxidative organic substances, like hydrazobenzene in solution, with the aid of oxygen in presence of water and alkali, separation of the alkali peroxide formed and reduction of the oxidized organic substance as a suspension in the reaction compound with aid of alkali amalgam to be led back into circulation.

In the processes hitherto known, the crystallisation of the alkali peroxide in the oxidation phase, has caused very big difficulties, as the precipitating crystals stick to the walls of the aggregate and block pipings and nozzles, in addition to which the alkali peroxide of very fine grain consistence produced by previous processes contains great amounts of solvent medium and autocatalyzer which is strongly colouring and negatively affects the permanence of the peroxide and its possibilities of use, at the same time as the expenses increase due to the losses of solvent medium and the costly autocatalyzer. The foregoing disadvantages, especially the difficulties in connection with the operation, are avoided according to this invention, which is characterized thereby, that the hydrazobenzene solution is introduced at one end, and brought to flow with such a continuous speed through a closed, at its other end furnished with an outlet, longish, preferably pipe-like reaction-path, under introducing of oxygen near the inlet, that due to the velocity of the reaction as well as the course of the flow and the extension of the reaction-path, depending on the supplied reaction components, a desired amount of hydrazobenzene will be oxidized whereas at the same time precipitating crystals of alkali peroxide are carried away with the flow in form of a suspension, to be brought, without forming sediments, to the opposite end of the reactor-path, where it is taken out together with the azobenzene solution in a manner known per se, and separated therefrom outside the reactor-path, at which instance the azobenzene solution recovered from the alkali peroxide is led back into the circulation through a reductor.

If the hydrazobenzene is not completely oxidized, in which case it is removed together with the azobenzene at the outlet end of the reactor-path, the mixture of these may, after eventual separation of the alkali peroxide, to a large extent be led back to the oxidation phase, whereas the remainder is transferred to the reduction phase, at the same time correspondingly decreasing the quantity of hydrazobenzene solution transferred from the reduction phase to the oxidation phase. When applying such a process the extension of the reaction-path in the oxidation phase can be decreased, which is also achieved by having two or more reactor-paths coupled in series, where between eventually is made a separation of the alkali peroxide obtained. It is in certain cases advantageous to lead back the crystal substance or at least part of it, taken out already before the final outlet, to the reaction-path together with the incompletely oxidized reaction-mixture, so that the crystals thus introduced serve as crystal-nuclei for production of a coarse grain product.

The invention also comprises a device for the execution of the foregoing process, which device is mainly characterized by a preferably vertical reactor tower with devices at its lower end for continuous introduction of hydrazobenzene from the reduction phase of a device known per se for production of alkali peroxide with a suitable autoxidable organic mixture as initial material as well as devices for introduction of oxygen to the hydrazobenzene in as fine and even distribution as possible in close connection to its place of introduction in the reaction-tower.

A device in accordance with the invention is schematically shown as an example on the enclosed drawing, which shows only the part belonging to the oxidation phase of the process of production, while leaving out the reduction phase and other parts nonessential in relation to the invention.

On the drawing 1 designates a vertical, longish oxidation tower or tube, to which the refrigerated hydrazobenzene solution with necessary percentage of alkali is introduced from the reduction phase by means of a pump 2 at the inlet 3. 4 on the drawing marks the inlet for introduction of oxygen near the bottom of the tower but preferably somewhat above the inlet 3 for hydrazobenzene solution. The oxygen inlet is equipped with an oxygen atomiser 5 shown only schematically. Both the liquid and the gas thus flow in the same direction from the bottom to the top and the velocity of the flow is chosen so, that a sedimentation of solid material in the reaction-tower is avoided. According to the drawing the crystals begin to form at a height 6 after the reaction having reached a certain stage. For instance for $Na_2O_2$ in alcoholic solution it has been found, that the velocity of sedimentation is approx. 0.2"/sec. naturally depending somewhat on the size of the crystals and the concentration of the solution. In order to avoid sedimentation and to achieve that the crystals are carried away with the flow of liquid, the velocity of the flow has naturally to exceed the velocity of sedimentation to a sufficient degree. Usually a velocity of flow two times that of the sedimentation ought to be sufficient, but has naturally to be determined separately in each case and is easily regulated by the pump 2 and the introduced oxygen. Regarding the latter losses have however to be avoided. At the upper end of the reaction tower the reaction mixture containing peroxide crystals is taken out through an outlet 7. The peroxide is separated and the reaction liquid is partly or completely led back into circulation as described above to the reductor not shown.

Unreacted oxygen gas may naturally be recovered and after the outlet 7 a sediment-bowl 8 may suitably be installed in which, in certain cases, a post-oxidation may take place and from which the peroxide then is taken e.g. to a centrifuge. From the centrifuge the pure azobenzene solution is transferred to the reduction phase.

Naturally the outlet-end of the reactiton tower should be built with a cone-like decreasing diameter, whereby the outlet may be connected to this end in such a way, that at least larger gatherings of gas, which may cause explosions, are avoided.

By choosing the right material for the reaction-tower or the lining thereof, the tendency of the alkali peroxide crystals to stick to the walls can to a great extent be eliminated.

What I claim is:

1. In a process for the production of alkali metal peroxide by oxidizing a solution of an auto oxidative organic substance having at least two relatively easily split hydrogen atoms in the molecule with the aid of oxygen in the presence of water and alkali metal amalgam, separating alkali metal peroxide formed as a suspension in the reaction mixture and reducing the oxidized organic substance with the aid of said alkali metal amalgam and recycling said reduced organic substance, the improvement which comprises introducing said reduced organic substance in solution into the lower end of a vertical, elongated, transversely restricted reaction zone, causing said substances to flow continuously upwardly through said zone by introducing oxygen near the inlet end thereof, controlling the velocity of the reaction, the velocity of the flow, the extension of the reaction zone and the supply of the components so as to oxidize a desired amount of the auto oxidative organic substances and precipitate crystals of alkali metal peroxide, said crystals flowing upwardly in the form of a suspension, at a velocity sufficient to prevent sedimentation, to the opposite end of said reaction zone, removing said crystals together with said solution of oxidized organic substance and separating the crystals from said solution outside the reaction zone, reducing said solution separated from the alkali metal peroxide and leading said reduced organic substance back into said reaction zone.

2. A process as in claim 1 and including, removing a part of the reaction mixture from the reaction zone prior to said opposite end of said reaction zone and leading said removed part back into said reaction zone near the inlet end thereof.

3. A process as in claim 2 and including, substantially separating the alkali metal peroxide crystals from said part of the reaction mixture taken out from the reaction zone.

4. A process as in claim 1 and including, said oxidative organic substance being hydrazobenzene.

References Cited in the file of this patent

UNITED STATES PATENTS

| | | |
|---|---|---|
| 2,083,691 | Cunningham | June 15, 1937 |
| 2,158,523 | Pfleiderer | May 16, 1939 |
| 2,215,856 | Pfleiderer | Sept. 24, 1940 |
| 2,257,533 | Reich | Sept. 30, 1941 |
| 2,702,741 | Robertson | Feb. 22, 1955 |
| 2,726,935 | Canfield et al. | Dec. 13, 1955 |
| 2,737,440 | Roberts et al. | Mar. 6, 1956 |
| 2,797,151 | Schnur et al. | June 25, 1957 |